United States Patent [19]

Smith, Jr.

[11] 4,251,646
[45] Feb. 17, 1981

[54] THERMOPLASTIC BLEND OF POLYPROPYLENE, EPM AND PROPYLENE-ETHYLENE COPOLYMER

[75] Inventor: William S. Smith, Jr., Freehold, N.J.

[73] Assignee: Exxon Research & Engineering Co., Florham Park, N.J.

[21] Appl. No.: 61,358

[22] Filed: Jul. 27, 1979

[51] Int. Cl.$^3$ .................... C08L 23/16; C08L 23/12
[52] U.S. Cl. ........................ 525/88; 525/240
[58] Field of Search .................. 525/240, 88

[56] References Cited

U.S. PATENT DOCUMENTS

| | | | |
|---|---|---|---|
| 3,036,987 | 5/1962 | Ranalli | 525/240 |
| 3,478,128 | 11/1969 | Hagemeyer et al. | 525/88 |
| 3,632,674 | 1/1972 | Aishima et al. | 525/88 |
| 3,882,197 | 5/1975 | Fritz et al. | 260/897 |
| 4,036,912 | 7/1977 | Stricharczuk | 260/897 |

FOREIGN PATENT DOCUMENTS

| | | | |
|---|---|---|---|
| 657751 | 2/1963 | Canada | 525/88 |
| 684541 | 4/1964 | Canada | 525/88 |

*Primary Examiner*—Carman J. Seccuro
*Attorney, Agent, or Firm*—John J. Mahon

[57] ABSTRACT

Thermoplastic polymer blends of improved impact strength and knit line toughness consisting essentially of (a) 60–90% by weight polypropylene, (b) 30–35% by weight of thermoplastic crystalline heteroblock propylene-ethylene copolymer and (c) 30–35% by weight of an ethylene-propylene copolymer rubber.

5 Claims, No Drawings

THERMOPLASTIC BLEND OF POLYPROPYLENE, EPM AND PROPYLENE-ETHYLENE COPOLYMER

The present invention relates to three-component thermoplastic polymer blends, the principal component being crystalline polypropylene. These blends are especially adaptable for the preparation of molded articles.

More particularly, the present invention relates to a moldable thermoplastic polymer blend exhibiting certain improved physical properties, notably increased bulk material toughness and, importantly, increased knit line toughness.

Polypropylene is widely recognized as having a number of desirable properties for use in producing shaped articles, such as melting point, density and stiffness modulus. However, unmodified polypropylene is also known to have poor impact strength and for that principal reason, various blends of polypropylene have been developed exhibiting improved properties.

Blends of polypropylene, ethylene-propylene copolymer rubber (EPM is the ASTM designation) and high density polyethylene are known in the art and are disclosed, for example, in U.S. Pat. No. 3,256,367, issued June 14, 1966 to Jayne. Three component blends of stereoregular propylene-alpha-olefin copolymers, polypropylene and ethylele-alpha-olefin copolymer rubbers are also known and are disclosed, for example, in U.S. Pat. No. 3,882,197, issued May 6, 1975 to Fritz et al, in which the copolymer of propylene and the alpha-olefin is that of a higher alpha-olefin having 6-20 carbon atoms. Also, blends of EPM or EPDM polymers with crystalline polypropylene are disclosed in U.S. Pat. No. 4,036,912, issued July 19, 1977 to Stricharczuk. Similarly, blends of EPM or EPDM (ASTM designation for ethylene-propylene-diene terpolymer elastomer) with polyolefins are described in U.S. Pat. No. 3,835,201, issued Sept. 10, 1974 to Fischer. In U.S. Pat. No. 3,957,919 issued May 18, 1976 to Von Bodungen et al, are disclosed thermoplastic elastomer compositions comprising an EPDM, a $C_3$-$C_{16}$ monoolefin copolymer, and a polyethylene.

Other pertinent references include U.S. Pat. No. 4,087,486 issued May 2, 1978 to Fielding et al which approaches the knit line problem by addition of a peroxide to a polypropylene-EPM blend; U.S. Pat. No. 3,137,672 issued June 16, 1964 to Lehane which discloses blends of polyethylene and stereoregular polypropylene containing small amounts of amorphous ethylene-propylene copolymers and a solid additive such as a clay; and U.S. Pat. No. 3,354,239 issued Nov. 21, 1967 to Short which discloses blends of isotactic polypropylene with a specially structured polypropylene having an ethylene content in the range from about 2 to 25% by weight, whereby impact strength is improved.

One disadvantage to such molded articles prepared from three component blends has been the inability to increase knit line toughness to the same extent as bulk material toughness. The principal purpose of adding other polymers to polypropylene is to increase its inherently low bulk material toughness as measured by impact strength. Addition of polyethylene and EPM will impart improved impact strength but knit line toughness in such compositions is lower than unmodified polypropylene. Improvements in knit line toughness values are therefore highly desirable. The knit line of a molded article results from the use of multiple gated molds, the lines resulting from the meeting and/or recombination of molten polymer streams.

The present invention is based on the discovery that use of a thermoplastic propylene-ethylene copolymer in the blend with polypropylene and EPM provides substantially increased bulk material and knit line toughness values to the molded article not previously attainable with the conventionally used blend of polypropylene, high density polyethylene, and EPM.

In accordance with the present invention, there are provided thermoplastic polymer blends having improved bulk material toughness as measured by impact strength and knit line toughness values upon molding, consisting essentially of (a) 60% to 90% by weight of polypropylene; (b) 30% to 5% by weight of a thermoplastic propylene-ethylene copolymer; and (c) 30% to 5% by weight of an ethylene-propylene (EPM) copolymer rubber.

The polypropylene employed herein is well known in the art and is the low pressure, isotactic, crystalline polypropylene having generally a density of about 0.86 to 0.91 and a molecular weight of about 50,000 to 500,000 by the intrinsic viscosity method. Such polypropylenes also have a crystalline content of from about 40% to about 80%. These stereoregular polypropylenes are commercially available and are readily prepared using standard polymerization techniques known to the art.

The EPM copolymer rubber component of the blends of the present invention may generally contain about 30 to 80 weight percent of ethylene, preferably about 40 to 65 weight percent of ethylene. Most preferable for use in the present invention is an EPM containing about 40% by weight ethylene and having a Mooney Viscosity of about 40±5 at 212° F.

Thermoplastic propylene-ethylene copolymers useful in the present invention are known in the art and are block or random thermoplastic copolymers as opposed to the elastomeric EPM copolymer rubbers also used in the present invention. These copolymers contain polypropylene in a proportion greater than 50% and have been described as crystalline heteroblock copolymers having a crystalline melting point greater than 150° C. They are prepared by a sequential polymerization process as described for example in U.S. Pat. No. 3,937,758, issued Feb. 10, 1976 to Castagna and U.S. Pat. No. 3,262,992 issued July 26, 1966 to Holzer et al. The propylene in these polymers is present as isotactic polypropylene which gives these polymers a thermoplastic character. Propylene-ethylene thermoplastic copolymers useful in the compositions of the present invention may contain from about 60 to about 95 percent by weight of a polypropylene block and from about 5 to about 40 percent by weight of a postblock of a copolymer of ethylene and propylene, the postblock containing about 30 to 70 mole percent ethylene and preferably 35 to 60 mole percent.

The polymer blends in the present invention are thermoplastic and are usually processable via conventional techniques, and temperatures above about 200° C. Blends are readily extrudable and moldable, having acceptable flow properties. No curing or crosslinking agents are required in order to obtain the superior strengths of the blended and molded articles. Injection molding is the preferred method for preparing molded articles from the blends of the present invention.

Preferably the polymer blends of the present invention will contain about 80% to 85% by weight polypropylene, about 10% by weight of the thermoplastic propylene-ethylene copolymer and about 5% to 10% of EPM. Minor amounts of various special purpose additives can, of course, be tolerated in the polymer blends of the present invention and these include fillers, plasticizers, processing aids or lubricants, mold release agents, stabilizers, antioxidants and the like.

A preferrred method of preparing the blends of the present invention is to first prepare a two component blend of EPM and propylene-ethylene thermoplastic copolymer in a 1:1 weight ratio. This concentration is then diluted with sufficient polypropylene to provide the finished blend. However, the manner of preparing the blends is not a critical aspect of the present invention and the three components may be admixed in any order using standard polymer blending techniques and apparatus.

The invention is further illustrated by following examples which are not to be considered as limitative of its scope.

Blends A, B, C and D were prepared as reported in the table below. Blend B is the composition of the present invention and the other blends are included for the purpose of comparison. Comparison of properties shows significantly improved impact strength values (Izod Impact at 30° C.) for both Blends A and B, but Blend B exhibits significantly increased knit line toughness values over Blend A which is representative of the prior art. The values of importance for comparative purposes are underlined in the table. Blend C further shows the criticality of the blends of the present invention, since Blend C has unacceptable impact strength values. Both Blends A and C have knit line values which are less than unmodified polypropylene (Composition D) while the composition of the present invention shows a substantial increase in this property.

TABLE

| COMPONENTS | BLENDS - WEIGHT PERCENT | | | |
|---|---|---|---|---|
|  | A | B | C | D |
| Polypropylene[1] | 80 | 80 | 80 | 100 |
| High Density Polyethylene[2] | 10 | — | 10 | — |
| Propylene-Ethylene Copolymer[3] | — | 10 | 10 | — |
| Ethylene-Propylene Copolymer[4] | 10 | 10 | — | — |
| Melt Flow Rate @ 230° C., g/10 min. | 8.4 | 8.8 | 8.5 | 10.9 |
| Izod Impact, J/cm | | | | |
| 21° C., notched | 0.41 | 0.35 | 0.20 | 0.20 |
| −30° C., unnotched | 4.1 | 4.3 | 2.8 | 1.5 |
| −40° C., unnotched | 4.2 | 3.6 | 2.6 | 1.5 |
| Gardner Impact @ −30° C., J | 6 ± 2 | 9 ± 3 | <1.0 | <1.0 |
| Flexural Modulus (Secant), MPa | 780 | 940 | 1215 | 1215 |
| Tensile @ Yield, MPa | 25.9 | 24.9 | 31.9 | 32.9 |
| Elongation @ Yield, % | 14.6 | 12.7 | 12.7 | 16.4 |
| Knit Line Izod (unnotched) @ −30° C., J/cm | 0.91 | 2.4 | 1.2 | 1.5 |
| (Knit Line Izod ÷ Regular Izod) × 100, % | 22 | 56 | 44 | 100 |

[1] Shell Grade 5820, melt flow rate = 12 (ASTM D 1238)
[2] U.S.I. Grade LB 861, melt index = 2 (ASTM D 1238)
[3] Hercules Grade 8523, melt flow rate = 3 (ASTM D 1238)
[4] Exxon Chemical Company, 40 wt. % ethylene, VISTALON® 404

What is claimed is:

1. A thermoplastic polymer blend exhibiting improved bulk material toughness and knit line toughness properties consisting essentially of (a) 60 to 90% by weight of polypropylene, (b) 30% to 5% by weight of a thermoplastic crystalline heteroblock propylene-ethylene copolymer, and (c) 30% to 5% by weight of a ethylene-propylene copolymer rubber containing about 30% to 80% by weight ethylene.

2. The blend of claim 1 wherein the ethylene-propylene copolymer rubber contains about 40% to 65% by weight ethylene.

3. The blend of claim 1 wherein the thermoplastic crystalline heteroblock propylene-ethylene copolymer contains about 60% to 95% by weight propylene.

4. The blend of claim 1 wherein there is present about 85% of said (a) component, about 10% of said (b) component, and about 5% of said (c) component.

5. The blend of claim 1 wherein there is present about 80% of said (a) component, about 10% of said (b) component and about 10% of said (c) component.

* * * * *